United States Patent
Saulters (10) Patent No.: US 9,183,610 B2
(45) Date of Patent: Nov. 10, 2015

(54) METHOD FOR GRAPHICS DRIVER LEVEL DECOUPLED RENDERING AND DISPLAY

(71) Applicant: NVIDIA CORPORATION, Santa Clara, CA (US)

(72) Inventor: Scott Saulters, New Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 130 days.

(21) Appl. No.: 13/745,350

(22) Filed: Jan. 18, 2013

(65) Prior Publication Data

US 2014/0125680 A1     May 8, 2014

(30) Foreign Application Priority Data

Nov. 5, 2012    (TW) .............................. 101141097 A (51) Int. Cl.
*G06T 1/00*       (2006.01)
*G06T 15/00*      (2011.01)
*G06F 15/00*      (2006.01)
*G06T 1/20*       (2006.01)
*G09G 5/36*       (2006.01)

(52) U.S. Cl.
CPC *G06T 1/20* (2013.01); *G09G 5/363* (2013.01); *G09G 2340/0407* (2013.01); *G09G 2340/10* (2013.01)

(58) Field of Classification Search
CPC .................. G06F 15/00; G06F 15/16–15/161; G06T 1/00–1/0092; G06T 15/00–15/005

USPC .......................................... 345/501, 502, 522
See application file for complete search history.

(56) References Cited

U.S. PATENT DOCUMENTS

| | | | |
|---|---|---|---|
| 7,629,978 B1 * | 12/2009 | Diard | 345/502 |
| 7,698,579 B2 * | 4/2010 | Hendry et al. | 713/300 |
| 8,228,337 B1 * | 7/2012 | Khodakovsky et al. | 345/502 |
| 8,310,485 B1 * | 11/2012 | Yu et al. | 345/473 |
| 2007/0195099 A1 * | 8/2007 | Diard et al. | 345/501 |
| 2008/0204460 A1 * | 8/2008 | Marinkovic et al. | 345/502 |

* cited by examiner

*Primary Examiner* — Jacinta M Crawford
(74) *Attorney, Agent, or Firm* — Artegis Law Group, LLP (57) ABSTRACT

The invention provides a method for driving a graphic processing unit (GPU), where a driver applies two threads to drive one ore more GPUs. The method includes the steps of: (a) activating a rendering thread and a displaying thread in response to invoking by an application thread of a graphics application; (b) sending according to the rendering thread a plurality of rendering instructions for enabling generation of at least a first rendered frame and a second rendered frame; and (c) sending according to the displaying thread one or more interpolating instructions and one or more displaying instructions, the one or more interpolating instructions enabling execution of interpolation according to the at least a first rendered frame and the second rendered frame to create one or more interpolated frames, and the one or more displaying instructions enabling display of the one or more interpolated frames.

20 Claims, 4 Drawing Sheets

METHOD FOR GRAPHICS DRIVER LEVEL DECOUPLED RENDERING AND DISPLAY

CROSS-REFERENCE TO RELATED APPLICATIONS

This application is based on and claims the benefit of priority from Taiwan Patent Application 101141097, filed on Nov. 5, 2012, which is hereby incorporated by reference.

BACKGROUND OF THE INVENTION

1. Field of the Invention

The present invention relates to a method for driving a graphics processing unit (GPU).

2. Description of the Related Art

Conventionally a graphics processing unit (GPU) has to finish processing the current frame before it starts processing the next frame according to an instruction from a graphics driver. In general, frame processing comprises rendering (or similar calculation, for example interpolation) and displaying (that is, sending a rendered or calculated frame to a frame buffer in which the rendered or calculated frame waits for the display thereof).

Therefore, it is only after the current frame has been sent to a frame buffer that the GPU is able to process an instruction given by the graphics driver and related to the next frame.

SUMMARY OF THE INVENTION

In one aspect, the present invention provides a method for driving a graphics processing unit (GPU), especially to address the problem facing the prior art where the displaying period of the current frame depends on the time taken by the GPU to render or calculate the next frame.

Since the time taken by the GPU to render or calculate the next frame depends on calculation capability of the GPU and the quantity of frame data, users find that a frame is displayed for a relatively long period of time in some unsatisfactory situations.

In view of this, the present invention provides, in embodiments thereof, a method for controlling the time of displaying a frame independently of the time taken by the GPU to render the frame.

In particular, the method is preferably performed by a graphics driver of the GPU instead of at the application level, such that the method is applicable to non-specific graphics applications.

In another aspect, the present invention provides a method for driving a graphics processing unit (GPU) with multiple threads. The graphics driver activates a rendering thread and a displaying thread in response to invoking by an application thread of a graphics application. The rendering thread renders a frame. The displaying thread interpolates the frame and displays the frame.

Interpolated frames are created in response to an indication called by an application interface or a detection of a graphics driver. Furthermore, in a memory, data related to a color buffer, a motion buffer, and a depth buffer and required for the interpolated frames are copied and provided to the rendering thread and the displaying thread.

In another aspect, the present invention is characterized in that the rendering thread sends a plurality of rendering instructions for enabling generation of rendered frames. After generating any one of the rendered frames, the rendering thread provides the rendered frame to the displaying thread, and returns control to the graphics application in response to the displaying thread's confirmation of receipt of the rendered frame. Furthermore, a sleep cycle is inserted into the rendering thread according to a preset value, so as to limit a frame rendering rate.

In another aspect, the present invention is characterized in that the displaying thread reserves a plurality of the most recently rendered frames and the data of buffer of the rendered frames. According to the present invention, the frame rendering rate and a frame displaying rate are independent of each other, wherein a sleep cycle is inserted into the displaying thread according to a preset value, so as to limit the frame displaying rate. The interpolated frames are created by interpolation of the most recently rendered frame and second most recently rendered frame at the point in time when the interpolated frames are displayed. Each interpolated frame is displayed and watched by users.

In another aspect, the present invention is characterized in that the frame rendering rate and the frame displaying rate are independently controlled. The graphics driver of the present invention pre-stores a plurality of configurations about the frame rendering rate and the frame displaying rate. Users select one of the configurations according to a system operation mode. Alternatively, one of the configurations is selected automatically.

In an embodiment of the present invention, a method for driving a GPU comprises the steps of:
(a) activating a rendering thread and a displaying thread in response to invoking by an application thread of a graphics application;
(b) sending according to the rendering thread a plurality of rendering instructions for enabling generation of at least a first rendered frame and a second rendered frame; and
(c) sending according to the displaying thread one or more interpolating instructions and one or more displaying instructions, the one or more interpolating instructions enabling execution of interpolation according to the at least a first rendered frame and the second rendered frame to create one or more interpolated frames, and the one or more displaying instructions enabling display of the one or more interpolated frames.

In an embodiment of the present invention, a method for driving a GPU comprises the steps of:
(a) activating a rendering thread and a displaying thread in response to invoking by an application thread of a graphics application;
(b) sending according to the rendering thread a plurality of rendering instructions for enabling generation of at least a first rendered frame; and
(c) sending according to the displaying thread one or more computing instructions and one or more displaying instructions, the one or more computing instructions enabling execution of computing according to the at least a first rendered frame to create one or more computed frames, and the one or more displaying instructions enabling display of the one or more computed frames.

The present invention provides in an embodiment thereof a computer system, comprising:
a graphics processing unit (GPU);
a central processing unit (CPU) electrically connected to the GPU and adapted to execute a graphics driver to implement the aforesaid method for driving a GPU.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, computer system, methods, and computer program products are illustrated as structural or functional block diagrams or process flowcharts according to various embodiments of the present invention. The flowchart and block diagrams in the Figures illustrate the architecture, functionality, and operation of possible implementations of computer system, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that embodiments can be practiced on many different types of computer system 100. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

Figure 1:
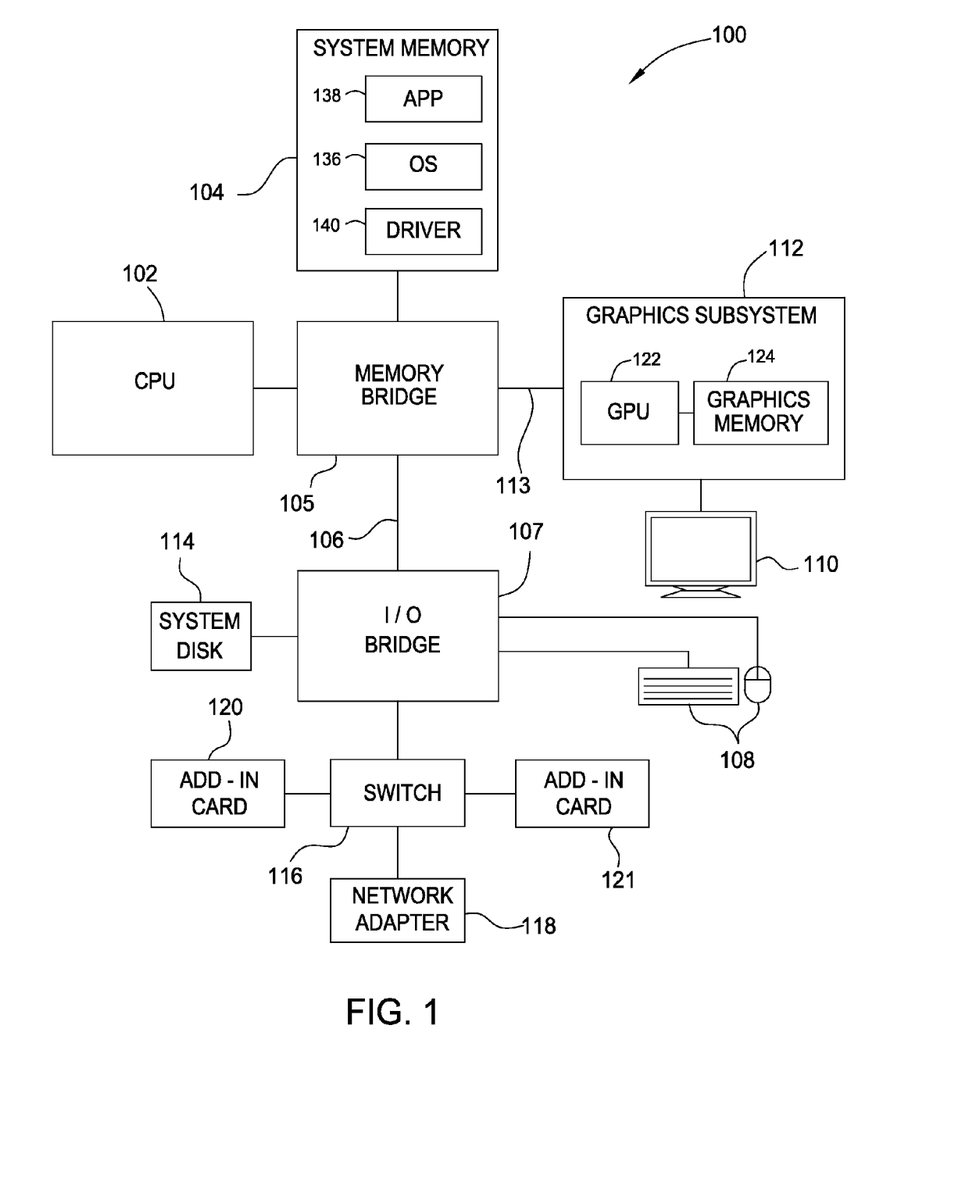
FIG. 1 is a block diagram of a computer system according to an embodiment of the present invention.

FIG. 1 is a block diagram of a computer system 100 according to an embodiment of the present invention. Computer system 100 includes a central processing unit (CPU) 102. CPU 102 communicates with a system memory 104 via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be a GPU 122 with one core or multiple cores. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 may also include a scanout module configured to deliver pixel data from graphics memory 124 to display device 110. It will be appreciated that the particular configuration and functionality of graphics processing subsystem 112 is not critical to the present invention, and a detailed description has been omitted.

CPU 102 operates as the master processor of system 100, controlling and coordinating operations of other system components. During operation of system 100, CPU 102 executes various programs that are resident in system memory 104. In one embodiment, these programs include one or more operating system (OS) programs 136, one or more graphics applications 138, and one or more graphics drivers 140 for controlling operation of GPU 122. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 114, and/or in other storage space.

Operating system programs 136 and/or graphics applications 138 may be of conventional design. A graphics application 138 may be, for instance, a video game program that generates graphics data and invokes appropriate functions of GPU 122 to transform the graphics data to pixel data. Another application 138 may generate pixel data and provide the pixel data to graphics memory 124 for display by GPU 122. It is to be understood that any number of applications that generate pixel and/or graphics data may be executing concurrently on CPU 102. Operating system programs 136 (e.g., the Graphical Device Interface (GDI) component of the Microsoft Windows operating system) may also generate pixel and/or graphics data to be processed by GPU 122. In some embodiments, applications 138 and/or operating system programs 136 may also invoke functions of GPU 122 for general-purpose computation.

Graphics driver 140 enables communication with graphics subsystem 112, e.g., with GPU 122. Graphics driver 140 advantageously implements one or more standard kernel-mode driver interfaces such as Microsoft D3D. OS programs 136 advantageously include a run-time component that provides a kernel-mode graphics driver interface via which graphics application 138 communicates with a kernel-mode graphics driver 140. Thus, by invoking appropriate function calls, operating system programs 136 and/or graphics applications 138 can instruct graphics driver 140 to transfer geometry data or pixel data to graphics processing subsystem 112, to control rendering and/or scanout operations of GPU 122, and so on. The specific commands and/or data transmitted to graphics processing subsystem 112 by driver 140 in response to a function call may vary depending on the implementation of graphics subsystem 112, and driver 140 may also transmit commands and/or data implementing additional functionality (e.g., special visual effects) not controlled by operating system programs 136 or applications 138.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of graphics subsystem 112 to the rest of system 100 may also be varied. In some embodiments, graphics system 112 is implemented as an add-in card that can be inserted into an expansion slot of system 100. In other embodiments, graphics subsystem 112 includes a GPU that is integrated on a single chip with a bus bridge, such as memory bridge 105 or I/O bridge 107. Graphics subsystem 112 may include any amount of dedicated graphics memory, including no dedicated memory, and may use dedicated graphics memory and system memory in any combination. Further, any number of GPUs may be included in graphics subsystem 112, e.g., by including multiple GPUs on a single graphics card or by connecting multiple graphics cards to bus 113.

First Embodiment

Figure 2:
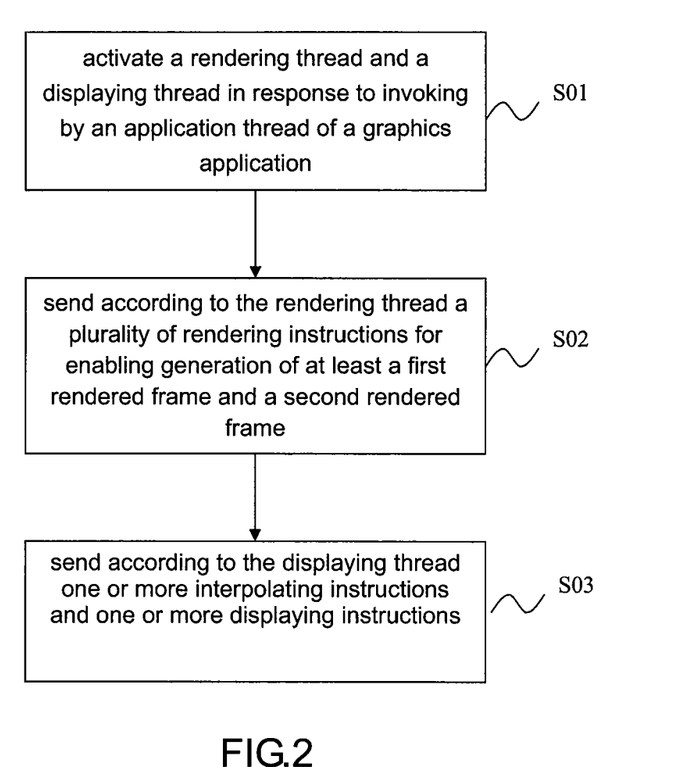
FIG. 2 is a schematic view of the process flow of a method for driving a graphics processing unit (GPU) according to an embodiment of the present invention.

Referring to FIG. 2, there is shown a schematic view of the process flow of a method for driving a graphics processing unit (GPU) 122 according to an embodiment of the present invention. The method is executed by a computer system 100 shown in FIG. 1. In particular, the method is executed by the CPU 102 operating in conjunction with the GPU 122, wherein the CPU 102 executes the graphics driver 140. In short, as shown in FIG. 2, the method involves rendering a frame by means of a rendering thread and then interpolating the frame and displaying the frame by means of a displaying thread.

Please refer to FIG. 1 and FIG. 2 for the following.

Step S01: the graphics driver 140 activates a rendering thread and a displaying thread in response to invoking by an application thread of a graphics application 138. For example, the application thread makes a request to the graphics driver 140 for calculating and displaying a frame and thus invokes the graphics driver 140 to activate a rendering thread and a displaying thread.

Step S02: according to the rendering thread, the graphics driver 140 sends rendering instructions in response to the request of the graphics application 138. After repetitious operation, the graphics driver 140 enables the GPU 122 to generate a first rendered frame and a second rendered frame in sequence, for example.

Specifically speaking, according to the rendering thread, the graphics driver 140 sends the rendering instructions to the GPU 122 for enabling generation of the first rendered frame and storing the first rendered frame in the graphics memory 124. After generating the first rendered frame, the graphics driver 140 further produces a copy of the first rendered frame, provides the copy to the displaying thread for use in an interpolation operation, and returns control to the graphics application 138 in response to the displaying thread's confirmation of receipt of the rendered frame. See the description of step S03 below for related details of the displaying thread.

Since the displaying thread requires at least two rendered frames for performing interpolation, after returning control to the graphics application 138, the graphics driver 140 can send the rendering instructions to the GPU 122 again according to the request of the graphics application 138 so as to calculate and generate the second rendered frame (i.e., the next rendered frame) and store the second rendered frame in the graphics memory 124; meanwhile, the rendering thread further produces a copy of the second rendered frame and provides the copy to the displaying thread for performing an interpolation operation. In another embodiment of the present invention, the displaying thread can also use one rendered frame for performing extrapolation.

The step of the rendering thread's providing the rendered frame to the displaying thread comprises producing a copy of the data stored in a color buffer, a motion buffer, and a depth buffer of the rendered frame and stored in the graphics memory 124 and then providing the copy to the displaying thread. Furthermore, before producing a copy of the data, a user has to make sure that the data in the aforesaid buffers are about the same rendered frame. In particular, prior to the completion of the copying process, the user has to not only prevent new frame data from being written to the aforesaid buffers, but also prevent wrongful acquisition of data about two different frames (i.e., an old frame and a new frame) during the copying process.

The present invention improves on the prior art, as, in step S02 of the present invention, the graphics driver 140 returns control to the graphics application 138 as soon as the displaying thread confirms the receipt of a copy of the rendered frame, and, at this point in time, the application thread of the graphics application 138 keeps making the request to the graphics driver 140 for calculating the next frame and thereby dispenses with the hassles of waiting for the displaying thread to create an interpolated frame and display the interpolated frame.

Furthermore, in general, the frame rendering rate varies with the quantity of frame data. Step S02 further comprises limiting the maximum frame rendering rate of the rendering thread according to a preset value. For example, a sleep cycle is inserted into the rendering thread according to a preset value, so as to limit the maximum frame rendering rate.

As the rendering thread is slept, the power to some but not all components of the graphic processing unit 122 is turned off, i.e., the graphic processing unit 122 is power-gated. Hence, the rendering rate is limited because the graphic processing unit 122 is not working as the rendering thread is slept. Please make reference to US Pub. 2012/0146706 for more details about engine level power gating (ELPG).

Furthermore, the preset value is for use in pre-storing a plurality of configurations, such that a user can select one of the configurations. Alternatively, one of the configurations is automatically selected according to a system operation mode (for example, various power modes, including a battery mode, and an alternating current power supply mode). The configurations of the preset value are further described below.

Step S03: unlike the rendering thread, the displaying thread is characterized in that, once the displaying thread is generated, the displaying thread will not be directly affected by the request for frame calculation performed by the graphics application 138. Interpolating instructions and displaying instructions are sent to the GPU 122 according to the displaying thread.

The purpose of the interpolating instructions is to enable the GPU 122 to execute interpolation for creating interpolated frames according to two rendered frames (for example, the first rendered frame and the second rendered frame in step S02). The purpose of the displaying instructions is to enable the GPU 122 to send the frames created by the aforesaid interpolation to a frame buffer to wait for display.

With the displaying thread, it is feasible to provide a plurality of interpolating instructions whereby the GPU 122 undertakes interpolation to create a plurality of frames according to two rendered frames, wherein each interpolating instruction requires the GPU 122 to execute interpolation once according to the respective weightings of the two rendered frames. After each interpolated frame has been created, a displaying instruction enables the GPU 122 to send the interpolated frame to the frame buffer to wait for display.

Take interpolating two rendered frames (that is, the first rendered frame and the second rendered frame in step S02) to create two frames as an example, during the process of the interpolation of the interpolated frames displayed in advance, the first rendered frame has a higher weighting than the subsequent second rendered frame does. Conversely, during the process of the interpolation of the interpolated frames displayed later, the first rendered frame has a lower weighting than the subsequent second rendered frame does. However, the present invention is not restrictive of a specific weighting rule and a specific interpolation method.

Furthermore, preferably, interpolating instructions enable the GPU 122 to perform interpolation according to the most recently rendered frame and the second most recently rendered frame. That is to say, each interpolated frame is created by interpolation of the most recently rendered frame and the second most recently rendered frame relative to the interpolated frame sent to the frame buffer to wait for display; meanwhile, the rendering thread enables a new frame to be rendered. Once the rendering thread enables the creation of a new rendered frame, the new rendered frame will be provided to the displaying thread. Afterward, the displaying thread will discard the old rendered frame and perform interpolation with the new rendered frame.

The speed at which the displaying thread creates interpolated frames is less likely to be affected by the quantity of frame data than the speed at which the rendering thread creates rendered frames is. Also, with only one most recently rendered frame and one second most recently rendered frame, it is feasible for the displaying thread to create an infinite number of interpolated frames. Hence, the speed at which the displaying thread creates interpolated frames is substantially constant, and thus the frame displaying rate is substantially constant too. Likewise, step S03 involves limiting the frame displaying rate of the displaying thread according to a preset value. For example, a sleep cycle is inserted into the displaying thread to limit the frame displaying rate according to a preset value. During a sleep cycle of the displaying thread, the power to some but not all components of the GPU 122 is turned off, that is, the GPU 122 is power-gated. The frame displaying rate is subjected to a limitation, because the GPU 122 is not working during the sleep cycle of the displaying thread. Likewise, a plurality of preset value configurations is pre-stored, such that a user can select one of the configurations, or, alternatively, one of the configurations is selected automatically according to the system operation mode (for example, various power modes, including a battery mode, and an alternating current (AC) power supply mode.)

In general, the rendering frames consume relatively much power, whereas the interpolating and displaying frames consume relatively less power. Hence, upon limitation, the preset value of the frame rendering rate is usually not larger than the preset value of the frame displaying rate. Furthermore, as mentioned earlier, the present invention involves pre-storing a plurality of configurations according to the system operation mode, such that a user selects one of the configurations, or, alternatively, one of the configurations is selected automatically, as shown in Table 1 below:

TABLE 1

|  | maximum frame rendering rate | frame displaying rate |
| --- | --- | --- |
| low power consumption mode | 10 Hz | 30 Hz |
| normal mode | 30 Hz | 60 Hz |
| high-performance mode | 60 Hz | 120 Hz |
| dynamic mode | 10 Hz~60 Hz | 60 Hz |

For example, if the computer system 100 is operating in the battery mode, the low power consumption mode can be selected by a user or automatically selected; hence, the rendering thread requires that a sleep cycle be inserted into the rendering thread so as to limit the maximum frame rendering rate to 10 Hz according to preset value 10 Hz, whereas the displaying thread requires that a sleep cycle be inserted into the displaying thread so as to limit the frame displaying rate to 30 Hz according to preset value 30 Hz. Alternatively, if the computer system 100 is operating at the AC power supply mode, the high-performance mode can be selected by a user or automatically selected; hence, the rendering thread requires that a sleep cycle be inserted into the rendering thread so as to limit the maximum frame rendering rate to 60 Hz according to preset value 60 Hz, whereas the displaying thread requires that a sleep cycle be inserted into the displaying thread so as to limit the frame displaying rate to 120 Hz according to preset value 120 Hz. Furthermore, the present invention further provides a sensor (not shown) disposed at a power (not shown) of the computer system 100, wherein a signal is sent according to the power temperature detected by the sensor or any other physical parameters to thereby dynamically change the preset value (that is, a dynamic mode) for the maximum frame rendering rate. In doing so, the maximum frame rendering rate is adjusted in response to a power status. Please note that the present invention does not intend to be limited by the configurations as shown in Table 1.

Second Embodiment

Figure 3:
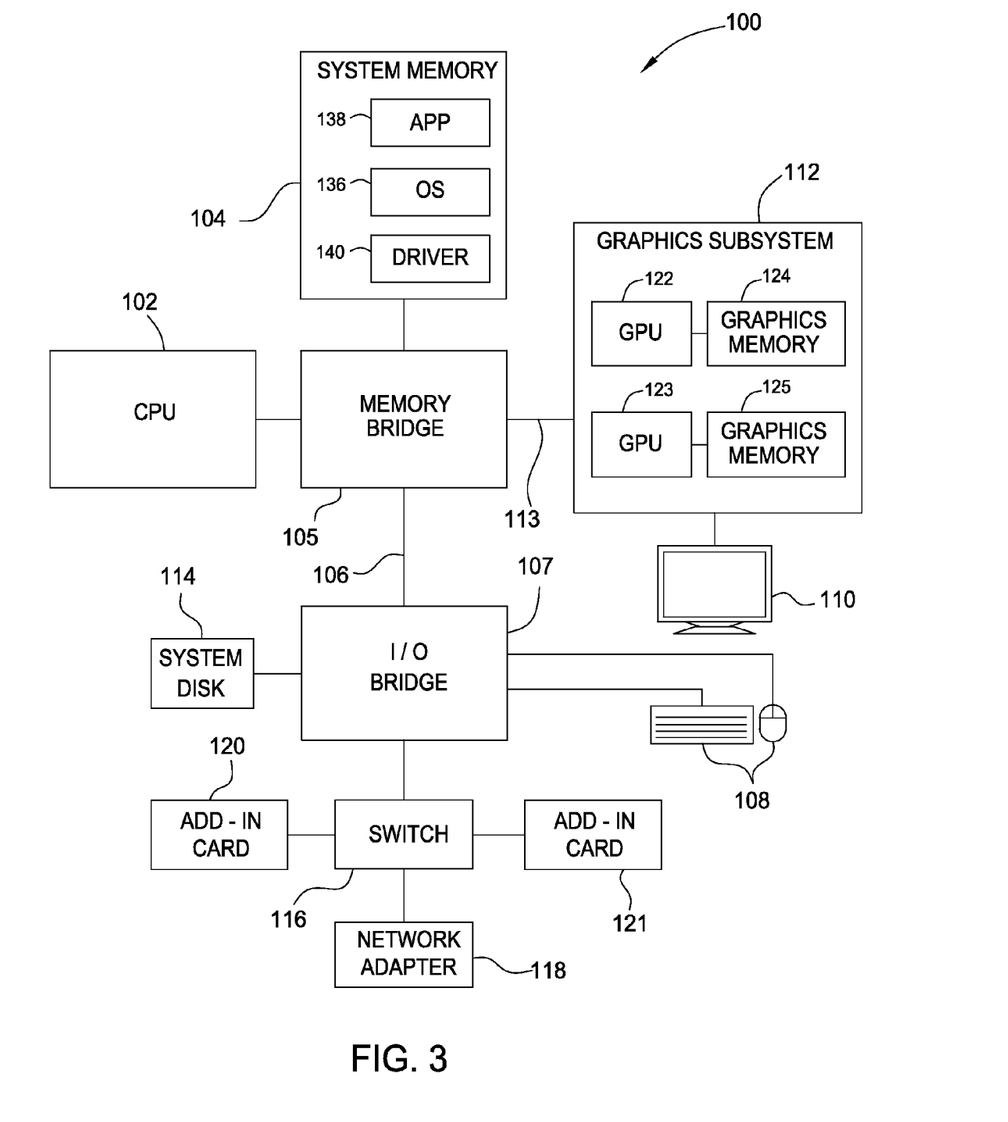
FIG. 3 is a block diagram of the computer system according to another embodiment of the present invention.

Referring to FIG. 3, there is shown a block diagram of the computer system 100 according to another embodiment of the present invention. Unlike the computer system 100 in FIG. 1, the computer system 100 in FIG. 3 is characterized in that a graphics subsystem 112 comprises a first GPU 122, a second GPU 123, a first graphics memory 124, and a second graphics memory 125.

Figure 4:
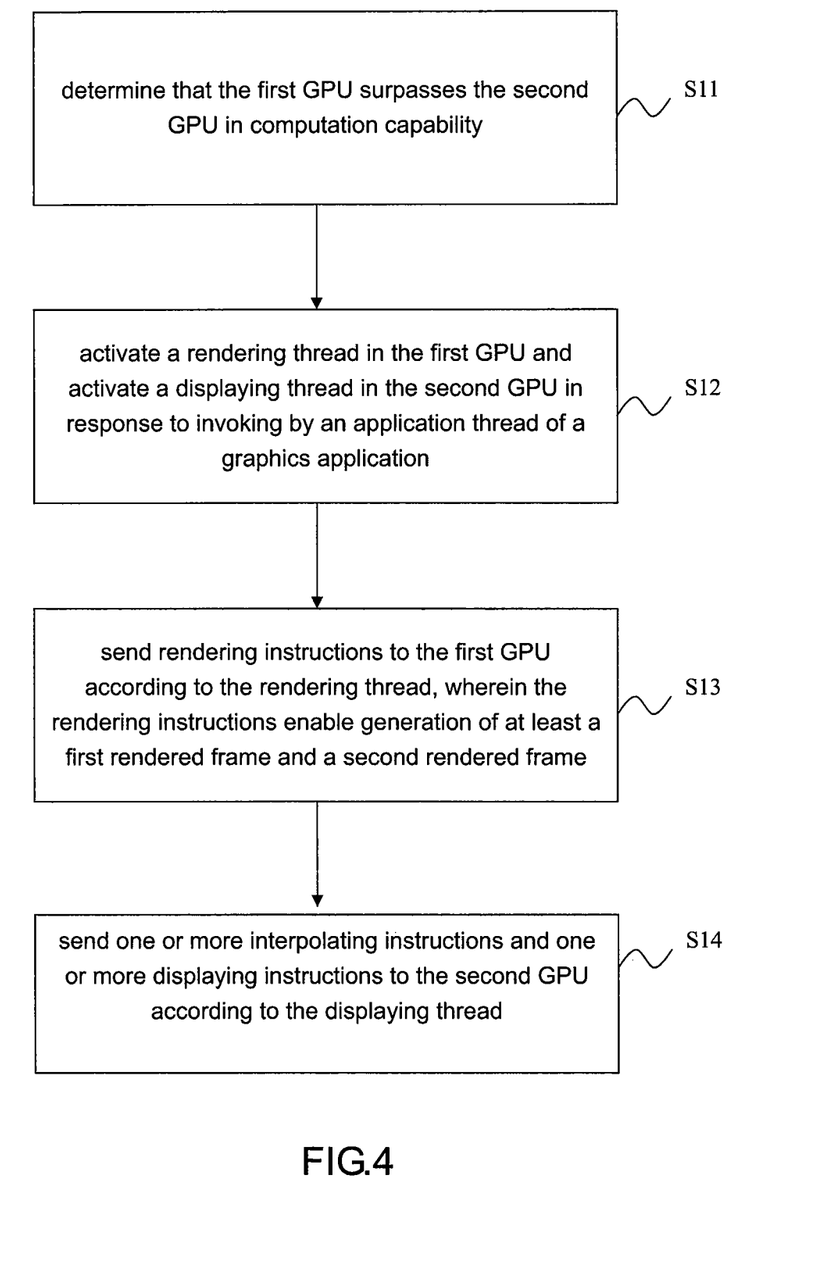
FIG. 4 is a schematic view of the process flow of a method for driving the GPU according to another embodiment of the present invention.

Referring to FIG. 4, there is shown a schematic view of the process flow of a method for driving the GPU 122 according to another embodiment of the present invention. Likewise, the method is applicable to the computer system 100 shown in FIG. 3 and is, in particular, adapted to be performed by the CPU 102 for executing the graphics driver 140 in conjunction with the GPUs 122, 123. In short, the method shown in FIG. 4 is adapted to execute a rendering thread for rendering a frame and execute a displaying thread for interpolating the frame and displaying the frame respectively according to two said GPUs 122, 123.

Please refer to FIG. 3 and FIG. 4 for the following.

Step S11: determining that the first GPU 122 surpasses the second GPU 123 in computation capability. According to the present invention, the graphics driver 140 acknowledges the computation capability of the first GPU 122 and the second GPU 123 according to the operating system (not shown) of the computer system 100 or assesses the computation capability of the first GPU 122 and the second GPU 123 with various performance testing software, so as to determine that the first GPU 122 surpasses the second GPU 123 in computation capability. The present invention is not limited to specific testing software or testing methods.

Step S12: activating a rendering thread in the first GPU 122 and activating a displaying thread in the second GPU 123 in response to invoking by an application thread of the graphics application 138.

Step S13: sending, according to the rendering thread, rendering instructions by the graphics driver 140 to the first GPU 122 in response to the request of the graphics application 138, wherein the graphics driver 140 sends the rendering instructions to enable generation of at least a first rendered frame and a second rendered frame in sequence by the first GPU 122, for example. The contents of operation of the rendering thread are described by the above description of the aforesaid step S02 and thus are not reiterated herein for the sake of brevity.

Step S14: unlike the aforesaid step S03, S14 is characterized in that, the interpolating instructions and the displaying instructions are sent to another GPU (that is, the second GPU 123) according to the displaying thread, such that the second GPU 123 executes interpolation to create interpolated frames according to two rendered frames (for example, the first rendered frame and the second rendered frame in step S13.) In this regard, the purpose of the displaying instructions is to enable the second GPU 123 to send the frames created by the aforesaid interpolation to the frame buffer to wait for display. The remaining portion of the contents of the operation of the displaying thread is described in step S03 and thus is not reiterated herein for the sake of brevity.

As indicated by the above description of the embodiments illustrated with FIG. 3 and FIG. 4, the present invention is applicable to the computer system 100 having two said CPUs 122, 123. The GPU 122 which has high computation capability executes the rendering thread. The GPU 123 which has low computation capability executes the displaying thread.

According to the above description of the first and second embodiments, the present invention provides a method for driving a GPU. The method is characterized in that the frame rendering rate and the frame displaying rate are independent of each other. The present invention involves rendering a frame by means of a rendering thread and then interpolating the frame and displaying the frame by means of a displaying thread. The rendering thread and the displaying thread of the present invention are executed in different GPUs, respectively. The present invention involves limiting the frame rendering rate of the rendering thread and the frame displaying rate of the displaying thread according to different preset values, respectively. In particular, the present invention involves pre-storing a plurality of preset value configurations to allow a user to select one of the configurations or allow one of the configurations to be selected automatically according to the current system operation mode.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A method for driving a graphics processing unit (GPU), the method comprising the steps of:
    activating a rendering thread and a displaying thread in response to invoking by an application thread of a graphics application;
    sending according to the rendering thread a plurality of rendering instructions for enabling generation of at least a first rendered frame and a second rendered frame; and
    sending according to the displaying thread one or more interpolating instructions and one or more displaying instructions, the one or more interpolating instructions enabling execution of interpolation according to the at least first rendered frame and the second rendered frame to create one or more interpolated frames, and the one or more displaying instructions enabling display of the one or more interpolated frames.

2. The method of claim 1, wherein the first rendered frame and the second rendered frame are the most recently rendered frame and the second most recently rendered frame, respectively.

3. The method of claim 1, wherein sending according to the rendering thread further comprises: in the rendering thread, providing, after any one of the first rendered frame and the second rendered frame has been generated, the rendered frame to the displaying thread, and returning control to the graphics application in response to the displaying thread's confirmation of receipt of the rendered frame.

4. The method of claim 1, wherein:
    sending according to the rendering thread further comprises sending the plurality of rendering instructions to a first GPU; and
    sending according to the displaying thread further comprises sending the one or more displaying instructions to a second GPU.

5. The method of claim 4, further comprising the step of determining that the first GPU surpasses the second GPU in computation capacity.

6. The method of claim 1, wherein the one or more interpolating instructions are for use in performing interpolations according to respective weightings of the first rendered frame and the second rendered frame so as to create the one or more interpolated frames.

7. The method of claim 1, wherein the displaying thread has a frame displaying rate that is limited to a first preset value.

8. The method of claim 7, wherein, the rendering thread has a frame rendering rate that is limited to a second preset value, wherein the second preset value is not larger than the first preset value.

9. The method of claim 8, further comprising the step of setting the first preset value and/or the second preset value.

10. The method of claim 9, further comprising the step of pre-storing a plurality of configurations of the first preset value and/or the second preset value for a user to select one of the configurations or for automatically selecting one of the configurations according to a current system operation mode.

11. A non-transitory computer-readable medium storing instructions, that when executed by a processor, cause a computer system to driving a graphics processing unit (GPU), by performing the steps of:
    activating a rendering thread and a displaying thread in response to invoking by an application thread of a graphics application;
    sending according to the rendering thread a plurality of rendering instructions for enabling generation of at least a first rendered frame and a second rendered frame; and
    sending according to the displaying thread one or more interpolating instructions and one or more displaying instructions, the one or more interpolating instructions enabling execution of interpolation according-to the at least a first rendered frame and the second rendered frame to create one or more interpolated frames, and the one or more displaying instructions enabling display of the one or more interpolated frames.

12. The non-transitory computer-readable medium of claim 11, wherein the first rendered frame and the second rendered frame are the most recently rendered frame and the second most recently rendered frame, respectively.

13. The non-transitory computer-readable medium of claim 11, wherein sending according to the rendering thread further comprises: in the rendering thread, providing, after any one of the first rendered frame and the second rendered frame has been generated, the rendered frame to the displaying thread, and returning control to the graphics application in response to the displaying thread's confirmation of receipt of the rendered frame.

14. The non-transitory computer-readable medium of claim 11, wherein:
    sending according to the rendering thread further comprises sending the plurality of rendering instructions to a first GPU; and
    sending according to the displaying thread further comprises sending the one or more displaying instructions to a second GPU.

15. The non-transitory computer-readable medium of claim 14, further comprising the step of determining that the first GPU surpasses the second GPU in computation capacity.

16. The non-transitory computer-readable medium of claim 11, wherein the one or more interpolating instructions are for use in performing interpolations according to respective weightings of the first rendered frame and the second rendered frame so as to create the one or more interpolated frames.

17. The non-transitory computer-readable medium of claim 11, wherein the displaying thread has a frame displaying rate that is limited to a first preset value.

18. The non-transitory computer-readable medium of claim 17, wherein, the rendering thread has a frame rendering rate that is limited to a second preset value, wherein the second preset value is not larger than the first preset value.

19. The non-transitory computer-readable medium of claim 18, further comprising the step of setting the first preset value and/or and the second preset value.

20. A computing device for cause a computer system to drive a graphics processing unit (GPU), the computing device comprising:
    a processor; and
    a memory coupled to the processor, wherein the memory includes a program having instructions that, when executed by the processor, cause the processor to:
        activate a rendering thread and a displaying thread in response to invoking by an application thread of a graphics application;
        send according to the rendering thread a plurality of rendering instructions for enabling generation of at least a first rendered frame and a second rendered frame; and send according to the displaying thread one or more interpolating instructions and one or more displaying instructions, the one or more interpolating instructions enabling execution of interpolation according to the at least a first rendered frame and the second rendered frame to create one or more interpolated frames, and the one or more displaying instructions enabling display of the one or more interpolated frames.

* * * * *

UNITED STATES PATENT AND TRADEMARK OFFICE
CERTIFICATE OF CORRECTION

PATENT NO.        : 9,183,610 B2
APPLICATION NO.   : 13/745350
DATED             : November 10, 2015
INVENTOR(S)       : Scott Saulters It is certified that error appears in the above-identified patent and that said Letters Patent is hereby corrected as shown below:

TITLE PAGE:

Item (57) Abstract

Line 3, after "one" please delete "ore" and insert --or--.

IN THE CLAIMS:

Column 13, Line 5, Claim 20, delete "a".

Signed and Sealed this
Twenty-fourth Day of May, 2016

Michelle K. Lee
*Director of the United States Patent and Trademark Office*